US012776546B2

(12) United States Patent
Jeon et al.

(10) Patent No.: US 12,776,546 B2
(45) Date of Patent: Oct. 27, 2026

(54) BATTERY MODULE

(71) Applicant: SK Innovation Co., Ltd., Seoul (KR)

(72) Inventors: Hae Ryong Jeon, Daejeon (KR); Ha Chul Jeong, Daejeon (KR); Yang Kyu Choi, Daejeon (KR); Ho Yeon Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 216 days.

(21) Appl. No.: 17/538,632

(22) Filed: Nov. 30, 2021

(65) Prior Publication Data

US 2022/0173476 A1 Jun. 2, 2022

(30) Foreign Application Priority Data

Nov. 30, 2020 (KR) ........................ 10-2020-0164097

(51) Int. Cl.
*H01M 50/264* (2021.01)
*H01M 50/204* (2021.01)
*H01M 50/276* (2021.01)
*H01M 50/293* (2021.01)
*H01M 50/30* (2021.01)
*H01M 50/317* (2021.01)

(52) U.S. Cl.
CPC ....... *H01M 50/264* (2021.01); *H01M 50/204* (2021.01); *H01M 50/276* (2021.01); *H01M 50/293* (2021.01); *H01M 50/317* (2021.01); *H01M 50/394* (2021.01)

(58) Field of Classification Search
None
See application file for complete search history.

(56) References Cited

U.S. PATENT DOCUMENTS 6,278,259 B1 8/2001 Kimoto et al.
2011/0104532 A1* 5/2011 Buck .................. H01M 50/325 429/82
2014/0205878 A1* 7/2014 Ohgitani ............ H01M 50/204 429/82
2016/0036024 A1 2/2016 Choi et al.
(Continued)

FOREIGN PATENT DOCUMENTS

EP 3528308 A1 8/2019
EP 3641006 A1 4/2020
(Continued)

OTHER PUBLICATIONS

Extended European Search Report for application 21211131.4 issued by the European Patent Office on Apr. 21, 2022.
Office Action for European Patent Application No. 21211131.4 issued by the European Patent Office on Jun. 27, 2025.

*Primary Examiner* — Helen Oi K Conley
*Assistant Examiner* — Amanda Rosenbaum
(74) *Attorney, Agent, or Firm* — IP&T GROUP LLP

(57) ABSTRACT

A battery module includes: a plurality of battery sub-packing units including at least one battery cell and a case in which the at least one battery cell is accommodated; and a body frame unit in which the plurality of battery sub-packing units are installed, the body frame unit surrounding the plurality of battery sub-packing units to be isolated, wherein the case may include a sub vent hole for allowing communication between an interior of the case and an exterior of the case in which the at least one battery cell is disposed.

15 Claims, 13 Drawing Sheets

(56) References Cited

U.S. PATENT DOCUMENTS

| | | | | |
|---|---|---|---|---|
| 2017/0141365 | A1 | 5/2017 | Kim et al. | |
| 2018/0254444 | A1* | 9/2018 | Yoon | H01M 50/211 |
| 2019/0157636 | A1* | 5/2019 | Miler | H01M 50/30 |
| 2019/0252652 | A1* | 8/2019 | Guillemard | B64D 45/00 |
| 2020/0099114 | A1 | 3/2020 | Ryu et al. | |
| 2020/0176745 | A1* | 6/2020 | Lee | H01M 50/569 |
| 2020/0343604 | A1 | 10/2020 | Lee et al. | |
| 2020/0350530 | A1 | 11/2020 | Kim et al. | |
| 2021/0143498 | A1* | 5/2021 | Lee | H01M 50/211 |
| 2021/0226295 | A1* | 7/2021 | Kwon | H01M 50/284 |
| 2021/0328251 | A1* | 10/2021 | Zhao | H01M 10/613 |
| 2022/0021060 | A1* | 1/2022 | Yoo | H01M 50/24 |
| 2022/0059901 | A1* | 2/2022 | Ren | A62C 3/08 |
| 2022/0393298 | A1* | 12/2022 | Shin | H01M 50/209 |

FOREIGN PATENT DOCUMENTS

| | | | | |
|---|---|---|---|---|
| EP | 3671890 | B1 | 10/2020 | |
| KR | 10-2008-0064916 | A | 7/2008 | |
| KR | 10-1384919 | B1 | 4/2014 | |
| KR | 10-2016-0014828 | A | 2/2016 | |
| KR | 10-2017-0056976 | A | 5/2017 | |
| KR | 10-2017-0135469 | A | 12/2017 | |
| KR | 10-2018-0092406 | A | 8/2018 | |
| KR | 10-2019-0070006 | A | 6/2019 | |
| KR | 10-2019-0094921 | A | 8/2019 | |
| KR | 10-2020-0050296 | A | 5/2020 | |
| KR | 10-2020-0078344 | A | 7/2020 | |
| KR | 10-2020-0125184 | A | 11/2020 | |
| WO | 2019/203460 | A1 | 10/2019 | |
| WO | WO-2021221342 | A1 * | 11/2021 | H01M 50/383 |

* cited by examiner

BATTERY MODULE

CROSS-REFERENCE TO RELATED APPLICATION(S)

This application claims benefit of priority to Korean Patent Application No. 10-2020-0164097 filed on Nov. 30, 2020 in the Korean Intellectual Property Office, the disclosure of which is incorporated herein by reference in its entirety.

BACKGROUND

1. Field

The present disclosure relates to a battery module.

2. Description of Related Art

As technological development of and demand for mobile devices, electric vehicles, and energy storage systems (ESS) increase, demand for secondary battery cells as an energy source is rapidly increasing. A secondary battery cell is a battery capable of repeating charging and discharging because mutual conversion between chemical energy and electrical energy is reversible.

Such a secondary battery cell includes an electrode assembly such as a positive electrode, a negative electrode, a separator and an electrolyte, which are main components of a secondary battery, and a cell body member of a laminated film case that protects the electrode assembly.

However, such an electrode assembly generates heat while performing charging and discharging, and an increase in temperature due to such heat generation deteriorates the performance of the secondary battery cell.

In addition, when such heat generation is severe, internal pressure of the secondary battery cell increases, thereby causing a problem in which the secondary battery cell is ignited.

Moreover, when a plurality of secondary battery cells are mounted, such as in an electric vehicle, an energy storage system (ESS), or the like, a problem in which the secondary battery cell explodes with such ignition, and a flame propagates to other secondary battery cells in a vicinity thereof.

That is, there may be a problem in that the gas, flame, or the like generated inside the secondary battery cell may not be discharged externally, but may explode in a chain reaction while propagating to other secondary battery cells in the vicinity thereof.

Therefore, in order to improve the above-described mentioned problems or limitations, research into the battery module is required.

SUMMARY

An aspect of the present disclosure is to provide a battery module capable of preventing propagation of ignition of battery cells.

Another aspect of the present disclosure is to provide a battery module for guiding flames externally or extinguishing fire when a battery cell is ignited.

According to an aspect of the present disclosure, a battery module, includes: a plurality of battery sub-packing units including at least one battery cell and a case in which the at least one battery cell is accommodated; and a body frame unit in which the plurality of battery sub-packing units are installed, the body frame unit surrounding the battery sub-packing units to be isolated, wherein the case may include a sub vent hole for allowing communication between an interior of the case 120 and an exterior of the case 120 of the case in which the at least one battery cell is disposed.

Specifically, the case of the battery module according to an embodiment of the present disclosure may include an end panel respectively disposed in front and rear portions of the battery cell including an electrode tab of the battery cell, fastened such that the electrode tab extends externally, and having the sub vent hole is formed in a lower end portion thereof, and a surrounding cover provided in a form in which the end panel is respectively coupled to both end portions, and provided in a form of surrounding portions of the battery cell facing outwardly in a circumferential direction of the end panel.

Here, the end panel of the battery module according to an embodiment of the present disclosure may include a sub guide pipe disposed at the sub vent hole, communicating with the sub vent hole, and provided in a form extending outwardly.

The surrounding cover of the battery module according to an embodiment of the present disclosure may be formed the same metal material as the body frame unit.

In addition, the surrounding cover of the battery module according to an embodiment of the present disclosure may be formed of an aluminum material or a metal material having a melting point of at least 1000° C. or higher.

Specifically, the surrounding cover of the battery module according to an embodiment of the present disclosure may include a receiving can in which the end panel is coupled to both end portions, respectively, and provided in a form surrounding a lower surface portion and a side surface portion of the battery cell facing outwardly, and an upper panel coupled to an upper end of the receiving can and surrounding an upper surface of the battery cell.

In addition, in the receiving can of the battery module according to an embodiment of the present disclosure, a protrusion protruding externally may be formed at an upper end thereof, the upper panel may include an extension flange portion formed with a groove to which the protrusion is hooked and coupled to both end portions thereof.

In addition, the battery sub-packing unit of the battery module according to an embodiment of the present disclosure may include an inner pad disposed inside the case, in contact with all the battery cells, configured to block an inflow of external oxygen by generating at least one of carbon dioxide and nitrogen during oxidation.

Here, the inner pad of the battery module according to an embodiment of the present disclosure may be formed of a melamine material.

In addition, the body frame unit of the battery module according to an embodiment of the present disclosure may include an end frame covering front and rear wall portions of the plurality of battery sub-packing units, and in the end frame, a vent hole communicating therewith may be formed at a lower end portion thereof.

Here, the vent hole of the battery module according to an embodiment of the present disclosure may be open in the front-rear direction of the battery sub-packing unit, or may be open downwardly.

In addition, the end frame of the battery module according to an embodiment of the present disclosure may include a guide pipe disposed at the vent hole, communicated with the vent hole, and provided in a form extending in a direction of a sub guide pipe to be connected to the sub guide pipe disposed at the sub vent hole.

In addition, the end frame of the battery module according to an embodiment of the present disclosure may be provided by being inserted into the vent hole to block the vent hole, and may include a metal foam block formed of a material that is melted by flames generated inside the battery sub-packing unit.

In addition, the end frame of the battery module according to an embodiment of the present disclosure may include an open/close portion disposed at the vent hole, and for opening and closing the vent hole according to pressure of gas discharged from the inside of the battery sub-packing unit.

The open/close portion of the battery module according to an embodiment of the present disclosure may include a sealing plate disposed at the vent hole; an open/close rod, wherein, in the open/close rod, the sealing plate is coupled to one end portion of an external side, and a protruding tab is formed at the other end portion of an internal side; and a coil spring into which the open/close rod is inserted, and having one end portion fixed to the end frame and the other end portion fixed to the tab.

Alternatively, the open/close portion of the battery module according to an embodiment of the present disclosure may include a sealing plate disposed at the vent hole; and a plate spring having one side end portion coupled to the sealing plate, and the other side end portion fixed to a fixing bolt coupled to the end frame.

The body frame unit of the battery module according to an embodiment of the present disclosure may include a lower frame on which a lower wall portion of the battery sub packing unit is seated; and a side frame provided at a corner of the lower frame, and surrounding a side wall portion of the battery sub packing unit.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
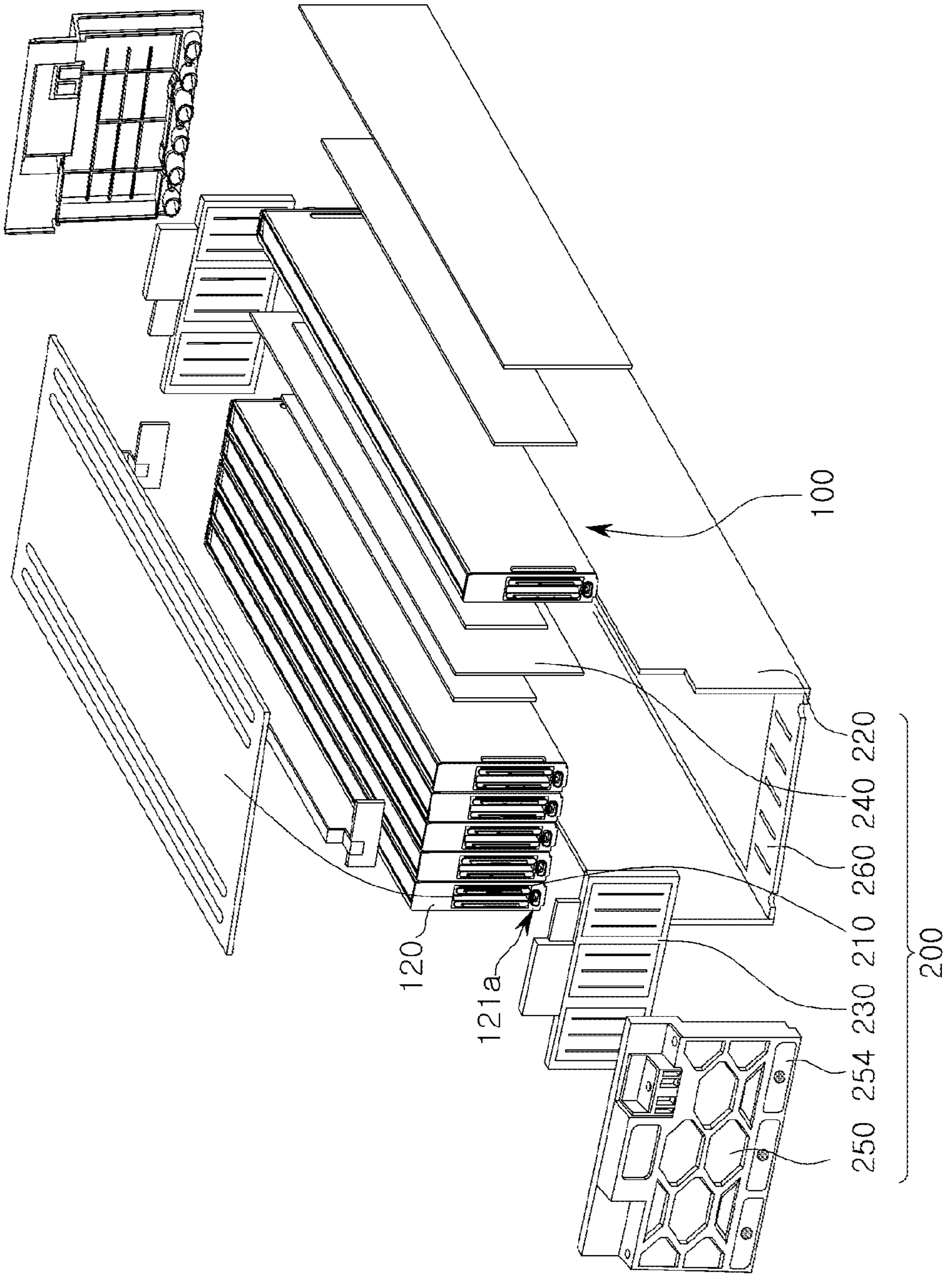
FIG. 1 is an exploded perspective view of a battery module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below"

or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Hereinafter, embodiments of the present disclosure will be described with reference to various examples. However, embodiments of the present disclosure may be modified to have various other forms, and the scope of the present disclosure is not limited to the embodiments described below.

Figure 2:
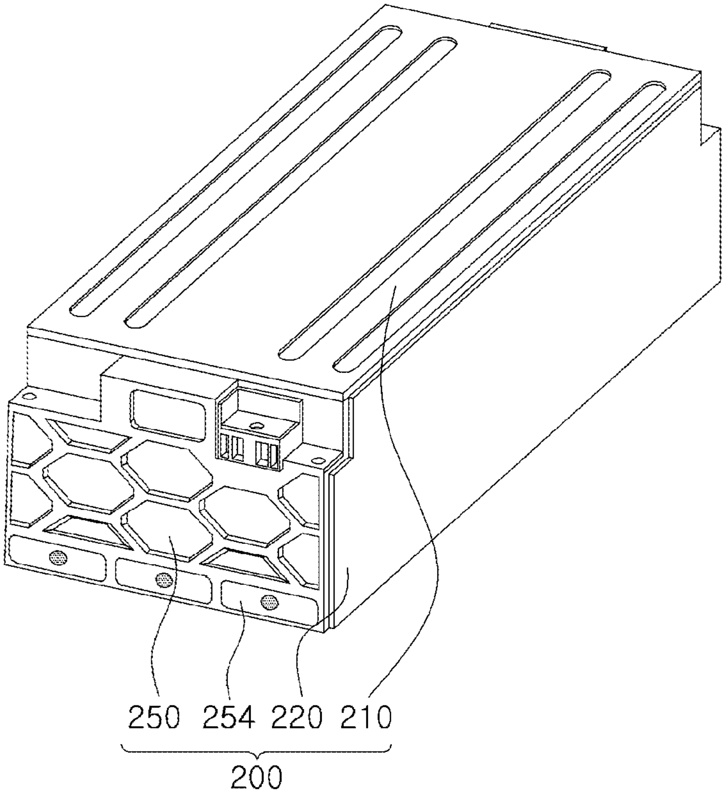
FIG. 2 is a perspective view illustrating a battery module according to an embodiment.
Figure 3:
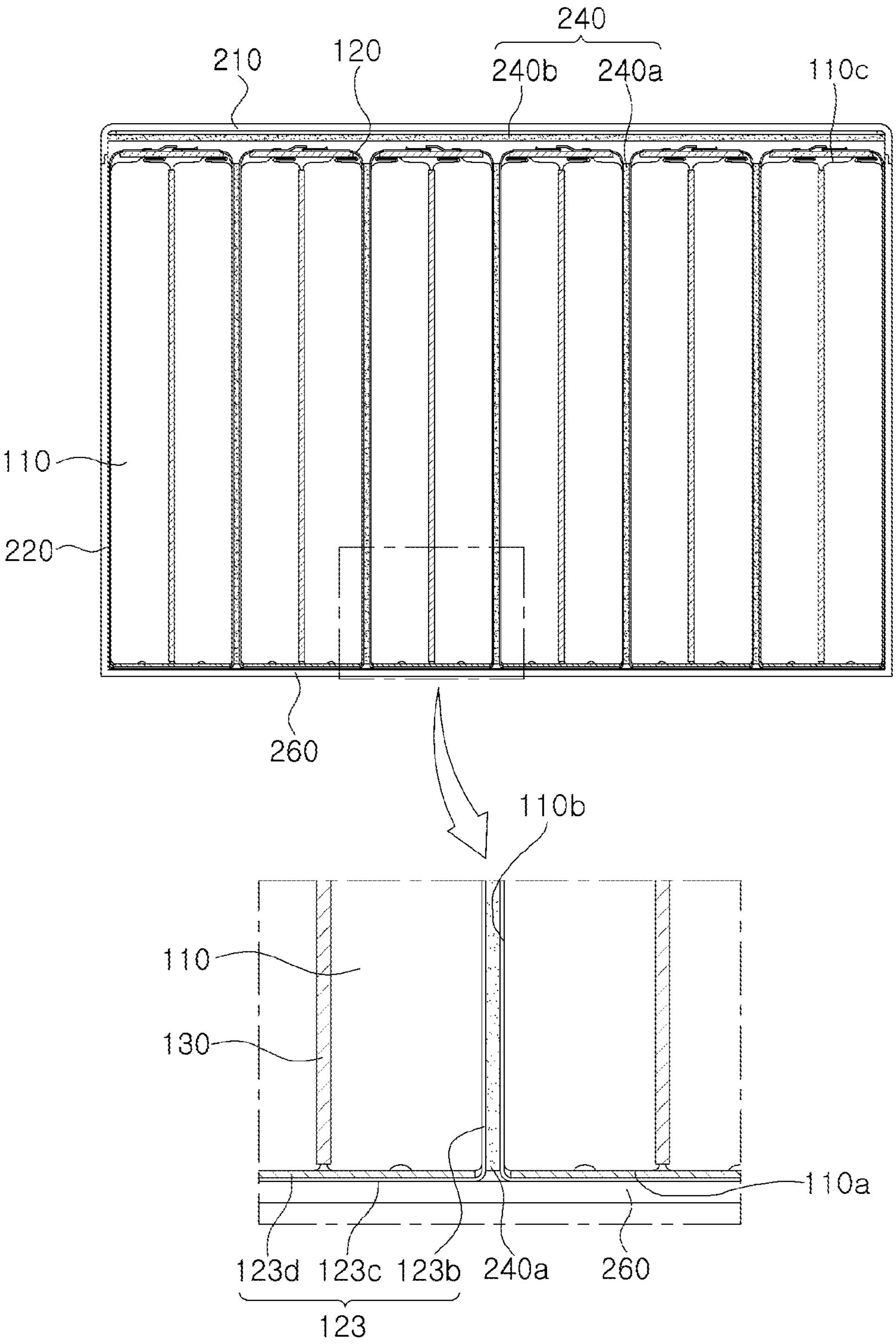
FIG. 3 a front view illustrating a cross-section of a battery module according to an embodiment.

FIG. 1 is an exploded perspective view of a battery module according to an embodiment of the present disclosure, and FIG. 2 is a perspective view illustrating a battery module according to an embodiment of the present disclosure. FIG. 3 is a front view illustrating a cross-section of a battery module according to an embodiment of the present disclosure.

Figure 10:
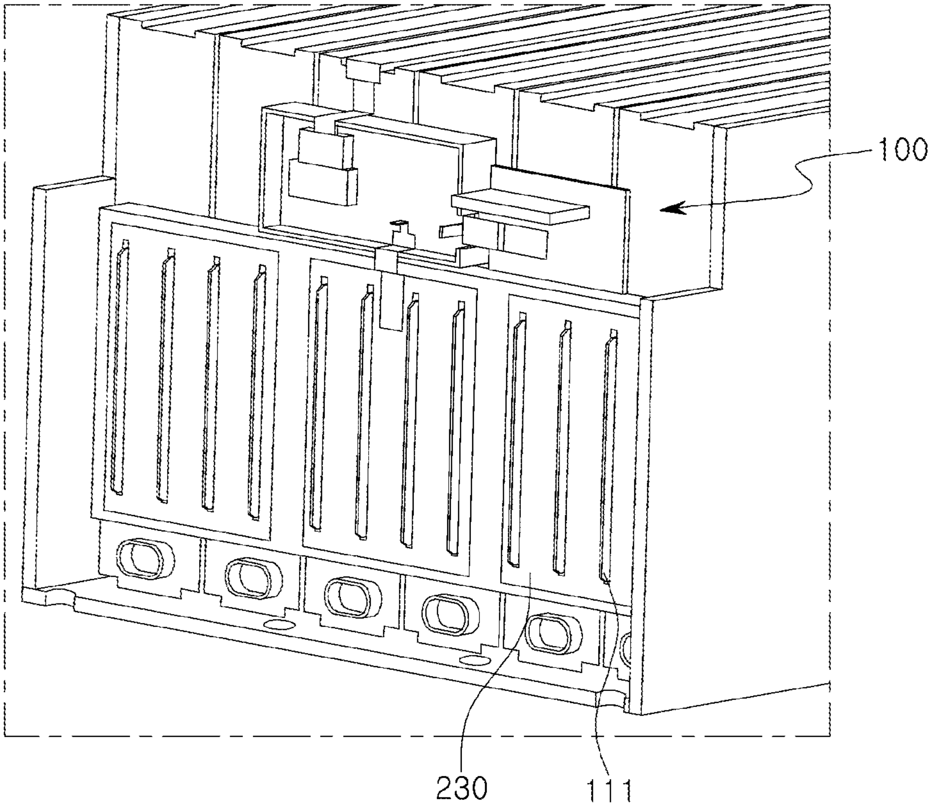
FIG. 10 is a perspective view illustrating a bus bar portion in a battery module according to an embodiment.
Figure 11:
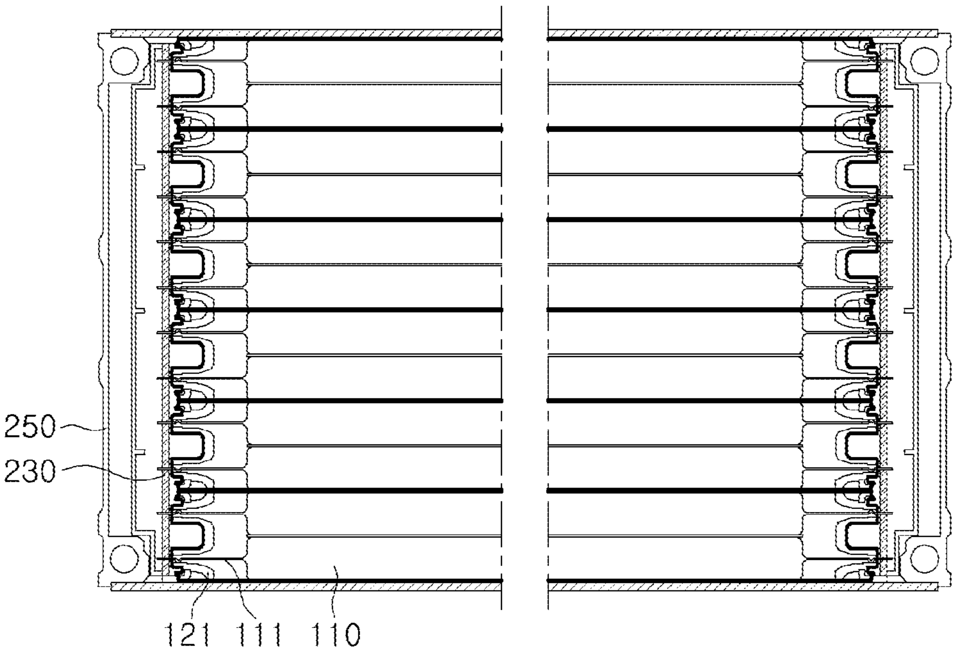
FIG. 11 is a plan view illustrating a cross-section of a battery module according to an embodiment.

FIG. 10 is a perspective view illustrating a bus bar 230 in a battery module according to an embodiment of the present disclosure, and FIG. 11 is a plan view illustrating a cross-section of the battery module according to an embodiment of the present disclosure.

Referring to the drawings, the battery module according to an embodiment of the present disclosure may include a plurality of battery sub-packing units 100 and a body frame unit 200.

Here, the battery sub-packing unit 100 may include at least one battery cell 110 and a case 120 in which the battery cell 110 is accommodated. The body frame unit 200 is configured to accommodate the plurality of battery sub-packing units 100. For example, the body frame unit 200 may be provided in a form surrounding the plurality of battery sub-packing units 100. In addition, the case 120 may include a sub vent hole 121*a* at a lower end thereof for allowing communication between an interior of the case 120 and an exterior of the case 120 of the case 120 in which the at least one battery cell 110 is disposed.

As described above, since the battery sub-packing unit 100 is configured to accommodate the battery cell 110, even when one or more battery cells 110 are ignited, propagation of the flame can be prevented by the battery sub-packing unit 100. Therefore, unlike a conventional battery module, in the battery module of the present disclosure, the battery sub-packing unit 100 and the body frame unit 200 provide double protection against the propagation of the flames.

In addition, as the sub vent hole 121*a* is provided, the battery module of the present disclosure may induce flame or gas to be discharged from a lower end portion of the battery sub-packing unit 100 externally when the battery cell 110 which is accommodated inside the sub-packing unit 100 is ignited. Accordingly, it is possible to prevent a problem that the ignition of the battery cell 110 accommodated in one battery sub-packing unit 100 is propagated to other battery cells 110 accommodated in other battery sub-packing units 100 in a vicinity thereof.

That is, since the battery sub-packing unit 100 induces a path to discharge the high-temperature, high-pressure flame and gas generated by the ignition of the battery cell 110 externally through the sub vent hole 121*a*, it is possible not to affect other the battery cell 110 accommodated in other battery sub-packing units 100 which are placed in the vicinity thereof.

In addition, since the battery sub-packing unit 100 can induce the flame to be discharged from the lower end portion externally, when the battery sub-packing unit 100 is mounted on an electric vehicle, a problem in which an occupant of the electric vehicle is affected by the ignition of the battery cell 110 may be minimized. That is, since the plurality of battery sub-packing units 110 are installed in the battery module, and the battery modules are generally mounted in a bottom portion of the electric vehicle, the occupant of the electric vehicle is disposed above the battery sub-packing unit 10. Therefore, when the flame is discharged from the lower end portion of the battery sub-packing unit 100, it is possible to minimize the effect on the occupants of the electric vehicle.

To this end, the battery sub-packing unit 100 may include one or two or more battery cells 110 and a case 120 enclosing the one or two or more battery cells 110.

The battery cell 110 may include, for example, an electrode assembly and a cell body member surrounding the electrode assembly.

The electrode assembly is used by being accommodated in the cell body member while substantially including the electrolyte. The electrolyte may include a lithium salt such as $LiPF_6$, $LiBF_4$ in an organic solvent such as ethylene carbonate (EC), propylene carbonate (PC), diethyl carbonate (DEC), ethyl methyl carbonate (EMC), or dimethyl carbonate (DMC). The electrolyte may be in a liquid, solid or gel state.

The cell body member may be configured to protect the electrode assembly, and to receive an electrolyte, for example, the cell body member may be provided as a pouch-type member or a can-type member. Here, the pouch-type member is configured to receive the electrode assembly and to seal on three or four surfaces to enclose the electrode assembly therein. The pouch-type member is a member mainly configured to be sealed by overlapping three surfaces of the upper surface 110*c* and front and rear portions, except for one surface portion, a mainly lower surface portion 110*a*, in a state in which the electrode assembly is accommodated therein. The can-shaped member is configured to seal and receive the electrode assembly on one surface, and is a member being mainly configured to be sealed by overlapping one surface of the upper surface 110*c*, in a state in which the electrode assembly is accommodated therein.

However, these pouch-type battery cells 110 and the can-type battery cell 110 are merely examples of the battery cells 110 accommodated in the battery sub-packing unit 100 of the present disclosure, and the battery cell 110 accommodated in the battery sub-packing unit 100 of the present disclosure is not limited to these types.

The battery cell 110 may include a lower surface portion 110*a*, an upper surface 110*c*, and a side surface portion 110*b*, and also includes front and rear portions through which an electrode tab 111 connected to the electrode assembly is exposed externally.

The case 120 may be configured to surround the battery cell 110 to accommodate the battery cell 110. For example, a pair of battery cells 110 may be accommodated in the case 120. Accordingly, when flames are generated in a battery cell 110 due to a malfunction of the battery cell, the flames can be guided to the sub vent hole 121*a*. A periphery of the battery cell 110 may be isolated by the case 120, and high-temperature, high-pressure flame and gas generated by igniting the battery cell 110 may be guided to the sub vent hole 121*a* to be discharged externally. Accordingly, the flame generated in any one of the battery sub-packing units 100 is alleviated so that it does not lead to an explosion, and also does not affect the battery cells 110 accommodated in the other battery sub-packing units 100 in the vicinity. To this end, the case 120 may include an end panel 121 and a surrounding cover 122. A detailed description thereof will be described later with reference to FIGS. 12 and 13.

The body frame unit 200 may accommodate a plurality of battery sub-packing units 100. The body frame unit 200 of the battery module according to an embodiment may include an upper frame 210, a side frame 220, a lower frame 260, and an end frame 250.

Here, the lower frame 260 may be configured to seat a lower wall portion of the battery sub-packing unit 100. The lower wall portion of the battery sub-packing unit 100 may be a lower wall portion 123*c* of an receiving can 123. The side frame 220 may extend upwardly from both ends of the lower frame 260, and may be provided to surround a side wall portion of the battery sub-packing unit 100. In an embodiment, the side frame 220 may include left and right side frames extending upwardly from respective opposite lateral ends of the lower frame 260, and may be provided to surround respective side wall portions of the battery sub-packing unit 100. The side wall portion of the battery sub-packing unit 100 may be a side wall portion 123*b* of the accommodating can 123. In one embodiment, the lower frame 260 and the side frame 220 may be integrally provided. For example, the lower frame 260 and the side frame 220 may have a shape of a “c” with an open upper portion.

The end frame 250 is provided at front and rear ends of the body frame unit 200, and may be connected to the bus bar 230 coupled to the electrode tab 111 of the battery cell 110. In an embodiment, the end frame 250 may include front and rear end frames 250 provided at front and rear ends of the body frame unit 200, respectively.

The upper frame 210 is provided on an upper end of the side frame 220 and the end frame 250, and may be configured to protect an upper surface (or end) of the battery sub-packing units 100.

Here, the lower frame 260 may be configured to transfer heat generated in the battery sub-packing unit 100 to an external heat sink to cool the same. The side frame 220 may also be configured to discharge heat generated in the battery sub-packing unit 100 externally.

In an embodiment, the bus bar 230 may include front and rear bus bars 230 disposed at the front and rear ends of the body frame unit 200. The bus bar 230 may be coupled to the electrode tab 111 of the battery cell 110 accommodated in each of the plurality of battery sub-packing units 100.

In addition, in the body frame unit 200 of the battery module according to an embodiment of the present disclosure, a barrier 240 may be disposed between adjacent battery sub-packing units 100 or between an upper portion of the battery sub-packing unit 100 and the body frame unit 200. Thereby, it is possible to prevent flame transfer or heat transfer. The barrier 240 may be formed of, for example, a mica sheet.

In addition, the vent hole 251 may be formed in the end frame 250 so that the flames, gas, or the like, discharged from the sub vent hole 121*a* are directly discharged externally. A detailed description thereof will be described later with reference to FIGS. 4 to 7.

Figure 4:
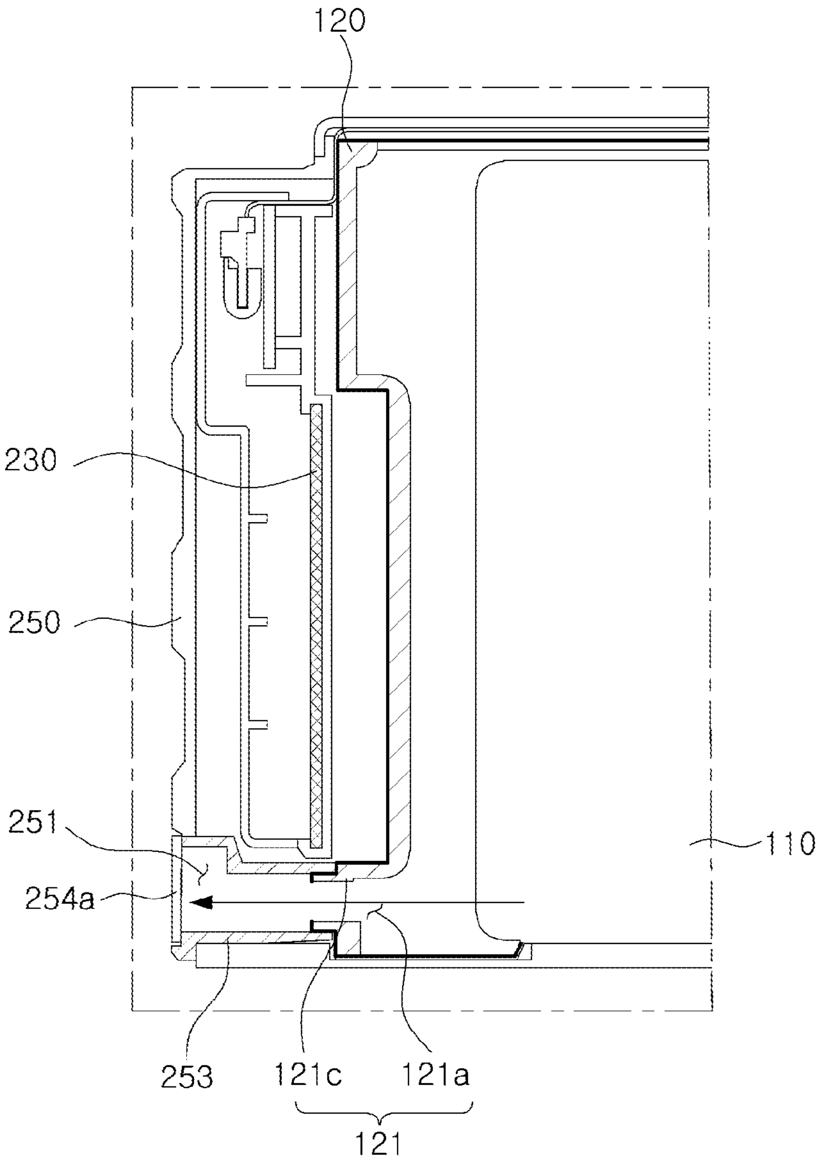
FIG. 4 is a side view illustrating a cross-section of a battery module according to an embodiment.
Figure 5A:
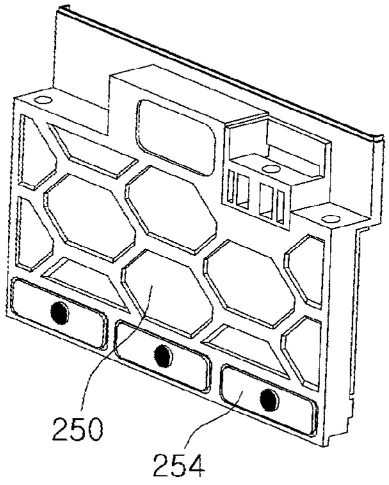
FIG. 5A is a front side view illustrating an end frame in a battery module according to an embodiment.
Figure 5B:
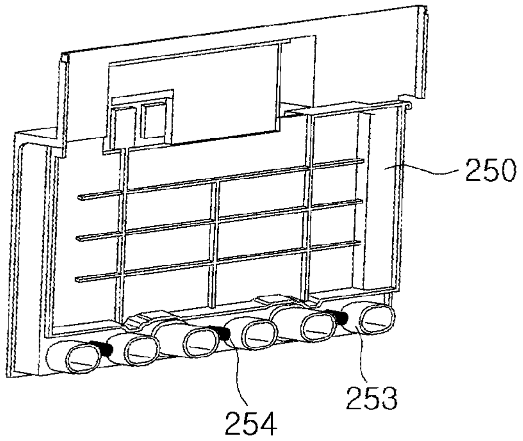
FIG. 5B is a rear side view illustrating an end frame in a battery module according to an embodiment.
Figure 6:
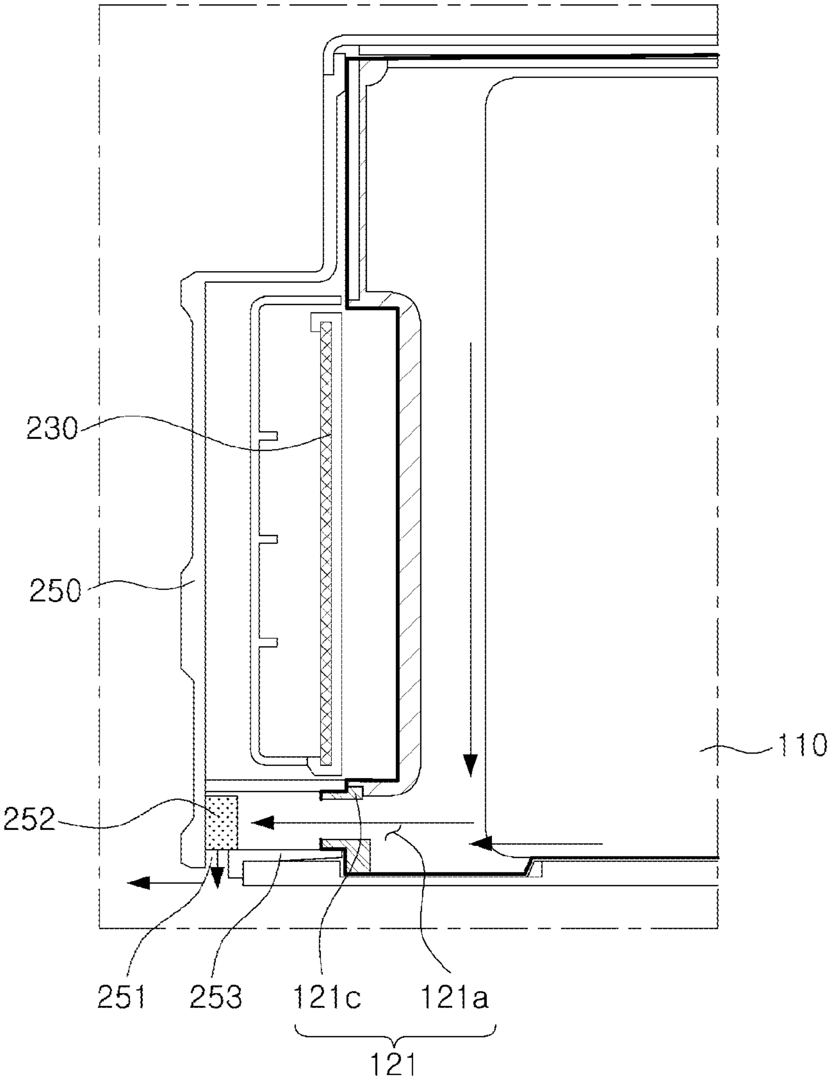
FIG. 6 is a side view showing an embodiment in which a vent hole is open downwardly of an end frame in a battery module.
Figure 7:
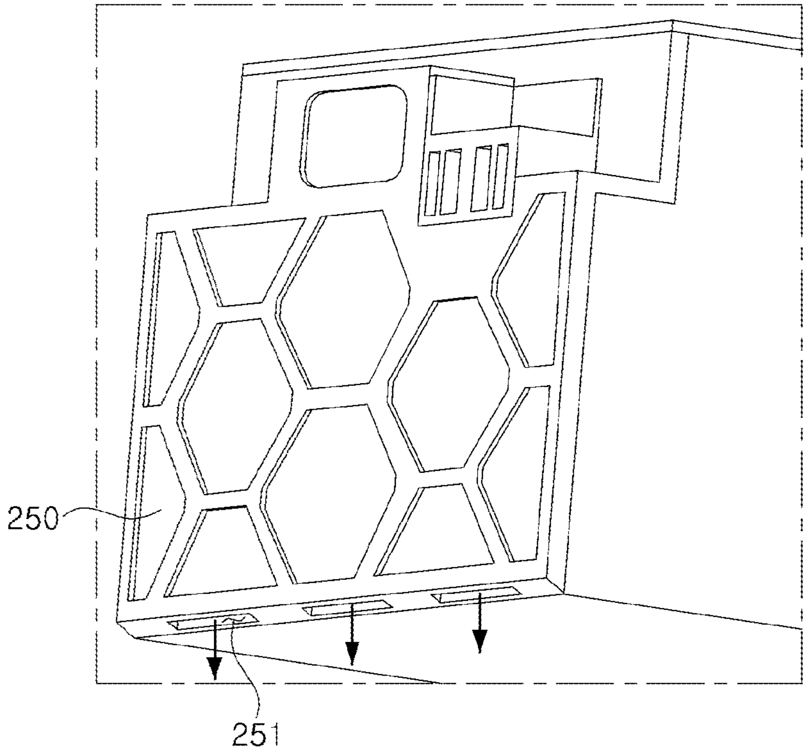
FIG. 7 is a perspective view illustrating an embodiment in which the vent hole is open downwardly of an end frame in a battery module.

FIG. 4 is a side view illustrating a cross-section of a battery module according to an embodiment of the present disclosure, and FIGS. 5A and 5B is a perspective view illustrating an end frame 250 in the battery module according to an embodiment of the present disclosure. FIG. 6 is a side view illustrating an embodiment in which a vent hole 251 is open in a downward direction of the end frame 250 in the battery module of the present disclosure, and FIG. 7 is a perspective view illustrating an embodiment in which a vent hole 251 is open in a downward direction of the end frame 250 in the battery module of the present disclosure.

A vent hole 251 may be formed in the end frame 250 in order to secure a discharge path for the flames and gas discharged from the battery sub-packing unit 100.

Moreover, the vent hole 251 is formed at a lower end portion of the end frame 250, and guides flames or gas to be discharged from a lower end portion of the body frame unit 200. Accordingly, when the battery module of the present disclosure is mounted in an electric vehicle, it is possible to minimize a problem that an occupant of the electric vehicle is affected by the ignition of the battery cell 110. That is, since the battery module is generally mounted on a bottom portion of the electric vehicle, the occupant of the electric vehicle is located above the battery module. Therefore, by allowing the flames and gas to be discharged to the lower end portion of the battery module, the effect of the flames or gas on the occupants of the electric vehicle can be minimized.

Here, the vent hole 251 of the battery module according to an embodiment of the present disclosure may be open in the front-rear direction of the battery sub-packing unit 100 or may be open downwardly. That is, the vent hole 251 may be formed at the lower end portion of the end frame 250, and may be formed such that the formed direction faces forwardly, backwardly, or downwardly.

In addition, in the battery module of the present disclosure, in order to prevent a problem in that an external foreign substance from penetrating into the body frame unit 200 through the vent hole 251, the vent hole 251 may be provided together with an open/close portion 254 or a metal foam block 252. Here, a detailed description of the open/close portion 254 will be described later with reference to FIGS. 8 and 9.

Since the open/close portion 254 requires a space for opening/closing the vent hole 251, it may be difficult that the open/close portion 254 is formed when the vent hole 251 is formed downwardly. Therefore, when the vent hole 251 is formed downwardly, the metal foam block 252 is provided to seal the vent hole 251, and when flames occur inside the body frame unit 200, it may be configured to open the vent hole 251.

That is, the end frame 250 of the battery module according to an embodiment of the present disclosure may include a metal foam block 252 inserted into the vent hole 251 to block the vent hole 251 and formed of a material melted by the flames generated inside the battery sub-packing unit 100.

In addition, the end frame 250 of the battery module according to an embodiment of the present disclosure may include a guide pipe 253 disposed on a periphery of the vent hole 251, communicating with the vent hole 251, and having a shape extending in a direction of a sub guide pipe 121*c* to be connected to the sub guide pipe 121*c*.

By providing the guide pipe 253, the flames generated inside the battery sub-packing unit 100 can be directly discharged from the sub vent hole 121*a* to the vent hole 251. Accordingly, it is possible to further prevent a problem of the flames occurring in one battery sub-packing unit 100 affecting other battery sub-packing units 100 in the vicinity thereof.

Figure 8:
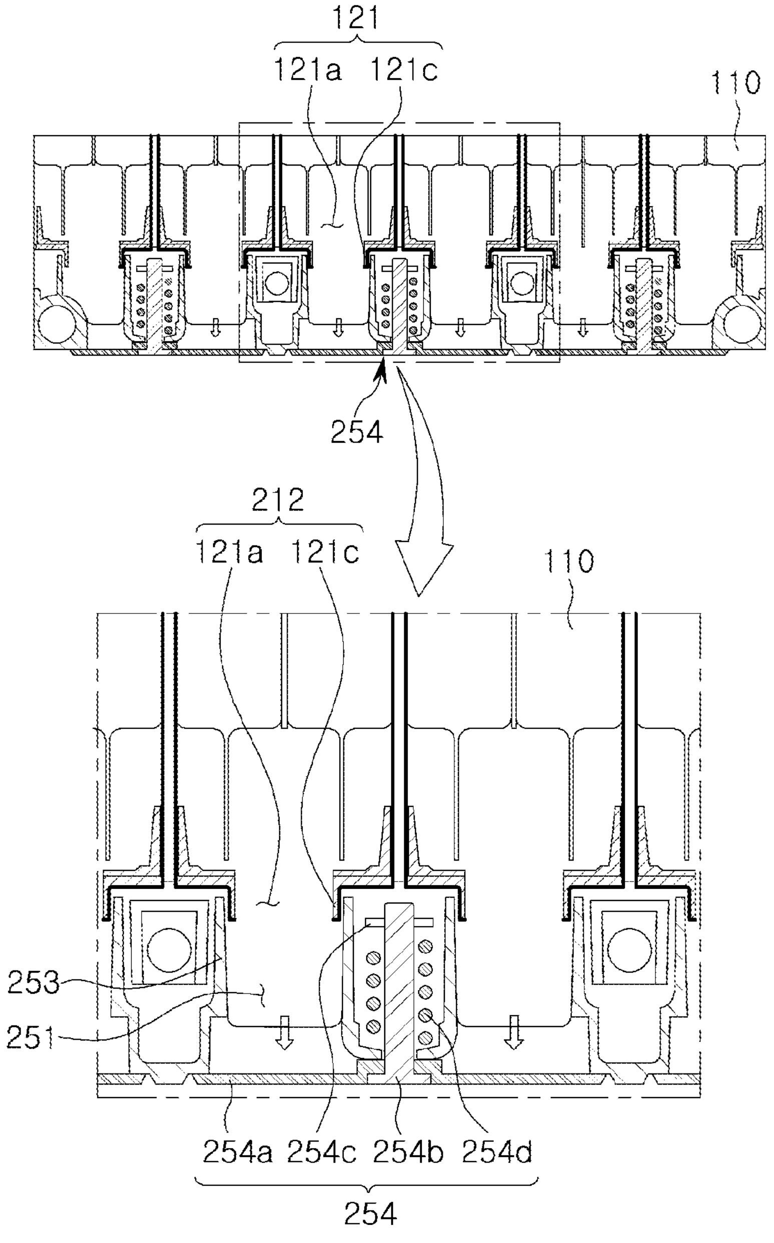
FIG. 8 is a plan view illustrating a cross-section of an embodiment in which an open/close portion includes a coil spring in a battery module.
Figure 9:
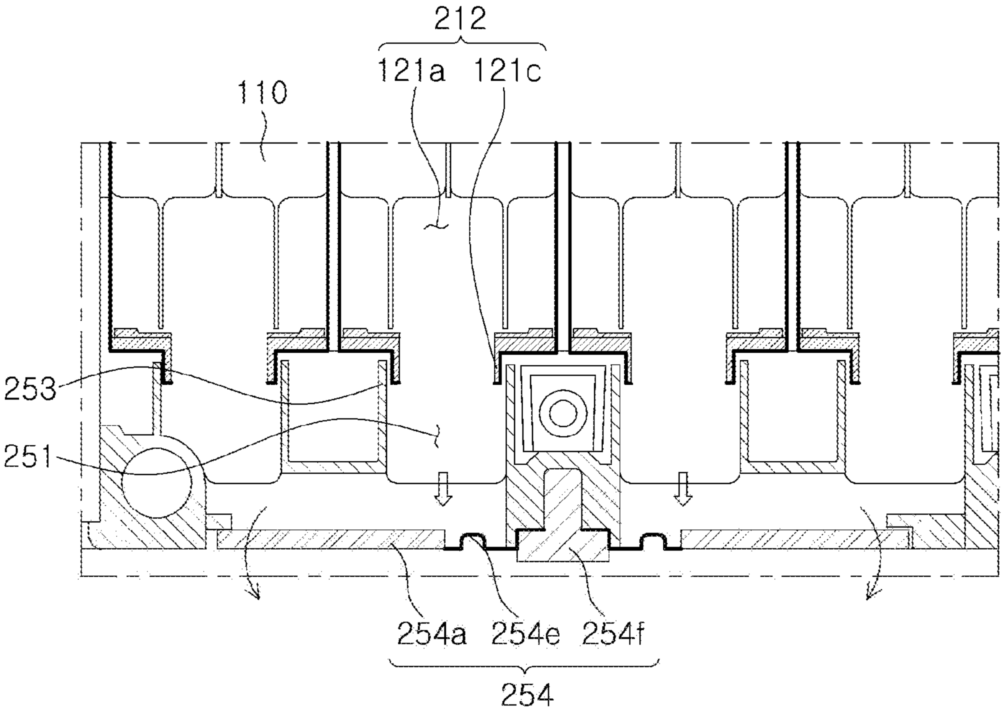
FIG. 9 is a plan view illustrating a cross-section of an embodiment in which an open/close portion includes a plate spring in a battery module.

FIG. 8 is a plan view illustrating a cross-section of an embodiment in which an open/close portion 254 includes a coil spring 254*d* in the battery module of the present disclosure, and FIG. 9 is a plan view illustrating a cross-section of an embodiment in which an open/close portion 254 in the battery module of the present disclosure includes a plate spring 254*e*.

Referring to the drawings, an end frame 250 of the battery module according to an embodiment of the present disclosure may include the open/close portion 254. Here, the open/close portion 254 may be disposed at a vent hole 251, and may be configured to open or close the vent hole 251 according to pressure of gas discharged from an inside of the battery sub-packing unit 100. Accordingly, it is possible to prevent a problem of foreign substances from penetrating into the body frame unit 200 through the vent hole 251.

Specifically, the open/close portion 254 of the battery module according to an embodiment of the present disclosure may be divided into a first embodiment including a coil spring 254*d* and a second embodiment including a plate spring 254*e*.

Referring to FIG. 8, an embodiment of the open/close portion 254 includes a sealing plate 254*a*, an open/close rod 254*b*, and a coil spring 254*d*, and the sealing plate 254*a* may be disposed in a vent hole 251. In addition, in the open/close rod 254*b*, the sealing plate 254*a* may be coupled to one end portion of an exterior side, and a protruding tab 254*c* may be formed at the other end portion of an internal side of the open/close rod 254*b*. The open/close rod 254*b* may be inserted into the coil spring 254*d*, and one end portion of the coil spring 254*d* may be fixed to the end frame 250, and the other end portion may be fixed to the protruding tab 254*c*.

Here, when the pressure of the gas discharged from the inside of the battery sub-packing unit 100 is increased, such that pressure greater than the elastic force of the coil spring 254*d* is applied to the sealing plate 254*a*, the coil spring 254*d* is contracted and the open/close rod 254*b* moves forward linearly, and the sealing plate 254*a* also moves forward linearly to open the vent hole 251.

Referring to FIG. 9, an embodiment of the open/close portion 254 includes a sealing plate 254*a* and a plate spring 254*e*, and the sealing plate 254*a* may be disposed at the vent hole 251. One side end portion of the plate spring 254*e* may be coupled to the sealing plate 254*a*, and the other side end portion thereof may be fixed to a fixing bolt 254*f* coupled to the end frame 250.

Here, when pressure of gas discharged from an inside of the battery sub-packing unit 100 is increased and pressure greater than elastic force of the plate spring 254*e* is applied to the sealing plate 254*a*, one end portion of the plate spring 254*e* is vent outwardly at a predetermined angle, and the sealing plate 254*a* also rotates at the same angle as the plate spring 254*e* to open the vent hole 251.

Figure 12:
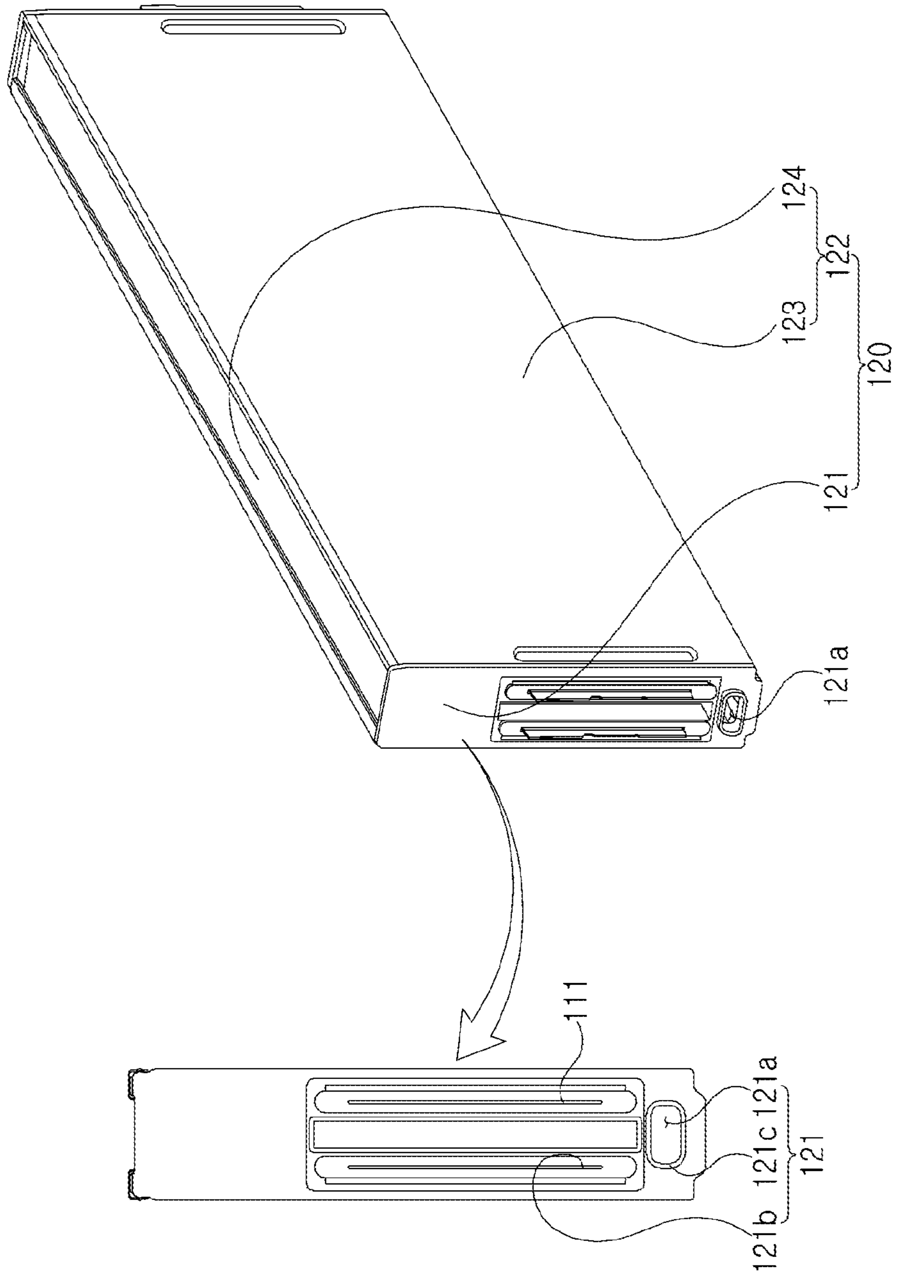
FIG. 12 is an enlarged view of a portion in which a sub vent hole is formed in a battery module according to an embodiment.
Figure 13:
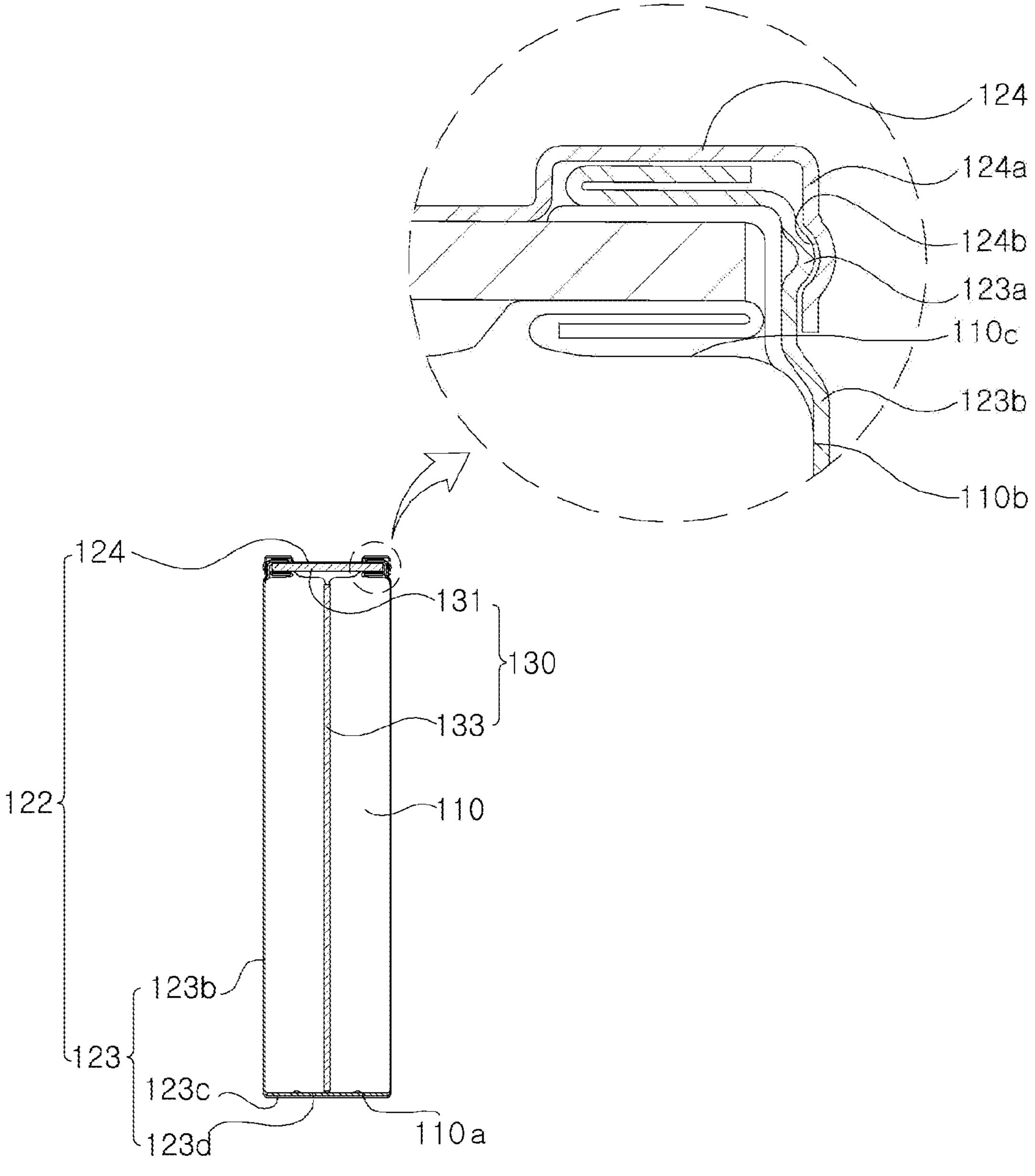
FIG. 13 is a cross-sectional view illustrating an embodiment in which a surrounding cover includes a receiving can and an upper panel in a battery module.

FIG. 12 is an enlarged view illustrating a portion in which a sub vent hole 121*a* is formed in the battery module according to an embodiment of the present disclosure, and FIG. 13 is a cross-sectional view illustrating an embodiment in which a surrounding cover 122 includes a receiving can 123 and an upper panel 124.

Referring to the drawings, a case 120 of the battery module according to an embodiment of the present disclosure may include an end panel 121 and a surrounding cover 122.

Here, the end panel 121 may be respectively disposed at front and rear portions of a battery cell 110 including an electrode tab 111 of the battery cell 110, and may be fastened such that an electrode tab 111 extends externally, and a sub vent hole 121*a* may be formed at a lower end portion thereof. An end panel 121 is coupled to both end portion of the surrounding cover 122, respectively. The surrounding cover 122 may be provided in a form of surrounding portions of the battery cell 110 facing outwardly in a circumferential direction of the end panel 121.

Here, the end panel 121 may cooperate with the surrounding cover 122 to accommodate the battery cell 110 in an isolated form from the exterior, except for a portion in which a sub vent hole 121*a* is formed. Accordingly, flames, gas, or the like generated in the battery cell 110 can be guided to the sub vent hole 121*a*.

In addition, the end panel 121 may include a sub guide pipe 121*c* in order to enhance an effect of guiding the flames, gas, or the like discharged through the sub vent hole 121*a* in a desired direction. That is, the end panel 121 of the battery sub-packing unit 100 according to an embodiment of the present disclosure may include a sub guide pipe 121*c*. The sub guide pipe 121*c* may be disposed at the sub vent hole 121*a*, communicate with the sub vent hole 121*a*, and may be provided in a form extending outwardly.

In addition, the end panel 121 may be formed to include a plurality of materials. That is, the end panel 121 of the battery sub-packing unit 100 according to an embodiment of the present disclosure may have an edge portion formed of the same metal material as the surrounding cover 122 and may be coupled to the surrounding cover 122 by welding, and a central portion in which a slit hole 121*b* through which an electrode tab 111 penetrates may be formed of an insulating material.

For example, an edge portion of the end panel 121 may be formed of a stainless steel material, or the like in which the surrounding cover 122 is formed, and a central portion of the end panel 121 in which a slit hole 121*b* is formed may be formed of a plastic material.

Here, the edge portion of the end panel 121 formed of a metal material and the central portion of the end panel 121 formed of a plastic material may be provided as a component integrally formed by double injection, or an integrated component coupled to each other in an assembly structure.

As described above, since the edge portion of the end panel 121 is made of the same metal material as that of the surrounding cover 122, coupling by welding is facilitated. In addition, since the central portion of the end panel 121 includes an insulating material, an electrical influence on the electrode tab 111 is minimized.

The surrounding cover 122 is configured to isolate the battery cell 110 in cooperation with the end panel 121, and to this end, is provided to surround the lower surface portion 110*a*, the side surface portion 110*b*, and the upper surface 110*c* of the battery cell 110 excluding the front and rear portions the battery cell 110.

The surrounding cover 122 may be limited in thickness and a material to prevent melting by flames, and to secure fire resistance. For example, the case 120 may be formed of a metal material having a thickness of about 0.2 mm to about 0.5 mm.

Specifically, the surrounding cover 122 of the battery module according to an embodiment of the present disclosure may be formed of an aluminum material or a metal material having a melting point of at least 1000° C. or higher.

Here, since the aluminum material has excellent moldability and may be extrusion-molded or die-cast, when the surrounding cover 122 includes an aluminum material, it may be manufactured by extrusion molding, die-casting, or the like.

In addition, the surrounding cover 122 of the battery module according to an embodiment of the present disclosure may be formed of the same metal material as the body frame unit 200. Accordingly, a problem of galvanic corrosion that may occur between the body frame unit 200 and the surrounding cover 122 can be prevented. That is, the problem of galvanic corrosion in which corrosion of a material on one side is accelerated according to a difference in ionization tendency.

Specifically, the surrounding cover 122 of the battery module according to an embodiment of the present disclosure may include a receiving can 123 and an upper panel 124.

Here, in the receiving can 123, the end panel 121 may be respectively coupled to both end portions thereof, and the receiving can 123 may be provided in a form of surrounding a lower surface portion 110*a* and a side surface portion 110*b* of the battery cell 110 facing outwardly. The upper panel 124 may be coupled to an upper end of the receiving can 123, and may be provided to surround an upper surface 110*c* of the battery cell 110.

As described above, when one battery cell 110 is accommodated, the receiving can 123 may have a "c" shape surrounding the lower surface portion 110*a* and both side surface portions 110*b* of one battery cell 110. That is, the receiving can 123 may be provided in a form in which the side wall portion 123*b* is coupled to the lower wall portion 123*c*.

In addition, when a pair of battery cells 110 is provided, the receiving can 123 may be provided in a "c" shape surrounding any one side surface portion 110*b* among the pair of battery cells 110 and the lower surface portion 110*a* among the pair of battery cells 110 while surrounding the other opposite side surface portion 110*b*. In addition, when three or more battery cells 110 are provided, the receiving can 123 may be provided in a "c" shape surrounding the side surface portion 110*b* facing outwardly of the battery cell 110 disposed at an outermost side of the three or more battery cells 110 and the lower surface portion 110*a* of the three or more battery cells 110.

Furthermore, the lower surface portion 110*a* of the battery cell 10 may be seated on a lower wall portion 123*c*, and a thermally conductive member 123*d* may be provided between the lower wall portion 123*c* of the receiving can 123 and the lower surface portion 110*a* of the battery cell 110.

As a configuration of the first embodiment of the surrounding cover 122, an upper panel 124 may be coupled to an upper end of the receiving can 123.

The upper panel 124 is coupled to the upper end of the receiving can 123 to surround the upper surface 110*c* of the battery cell 110. That is, the upper pad 124 may be provided to surround portions facing an outward direction of the battery cell 110 in a circumferential direction to the end panel 121 in cooperation with the receiving can 123.

In addition, the upper panel 124 may have a groove 124*b* formed therein, to be coupled to the upper end of the receiving can 123. In addition, the receiving can 123 may have a protrusion 123*a* that can be fitted into the groove 124*b*.

In an embodiment, the receiving can 123 may include a protrusion 123*a* at an upper end thereof, and a groove 124*b* accommodating the protrusion 123*a*. That is, in the receiving can 123 of the battery module according to an embodiment of the present disclosure, the protrusion 123*a* protruding externally may be formed at the upper end thereof, and in the upper panel 124, an extension flange portion 124*a* having a groove 124*b* to which the protrusion 123*a* is hooked and coupled to both end portions thereof.

As an example, an example of a method for the receiving can 123 and the upper panel 124 to be coupled in a state in which the battery cell 110 is accommodated may be as follows.

In a first step, at least one battery cell 110 is slidingly inserted into the receiving can 123. In a second step, an end panel 121 is disposed at both end portions of the receiving can 123, and the receiving can 123 and the end panel 121 are coupled by welding. In a third step, an upper panel 124 is seated on an upper end of the receiving can 123 and a protrusion 123*a* of the receiving can 123 is fitted into the groove 124*b* of the upper panel 124 and is fastened.

Here, the first step may be performed while the receiving can 123 is seated on a blank material in the form of a plate, and both end portions of the blank material are vent in a direction of a side surface portion 110*b* of the battery cell 110 to form the receiving can 123 in a "c" shape.

Further, the battery module according to an embodiment of the present disclosure may further include an inner pad 130.

Here, the inner pad 130 is disposed inside a case 120, is in contact with all the battery cells 110 accommodated in the case 120, and may generate at least one of carbon dioxide and nitrogen during oxidation to block an inflow of external oxygen.

That is, at least one of carbon dioxide and nitrogen is generated as the inner pad 130 is oxidized by the flames generated from the battery cell 110 inside the case 120, and the carbon dioxide and nitrogen fill an inside of the case 120, such that a problem in which external oxygen flows into the inside the case 120 does not occur. Accordingly, oxidation does not occur inside the case 120 and fire is extinguished.

Moreover, since the inner pad 130 contacts all the battery cells 110, even if flames occur in any one of the plurality of battery cells 110, the inner pad 130 is immediately oxidized to generate at least one of carbon dioxide and nitrogen. As a result, fire extinguishing proceeds rapidly.

Here, the inner pad 130 of the battery module according to an embodiment of the present disclosure may be formed of a melamine material.

Since this melamine material has a relatively high rate of nitrogen generation during oxidation compared to other materials, it is more effective for extinguishing fire.

An inner pad 130 may be disposed between the battery cell 110 and the case 120. The inner pad 130 may be disposed on at least one of space between a side surface of the battery cell 110 and an inner surface of the case 120 and between an upper surface of the battery cell 110 and an inner surface of the case 120. For example, in order to contact with at least a portion of the battery cells 110, the inner pad 130 may include a side pad disposed between the side surface of the battery cell 110 and the inner surface of the case 120 and an upper pad 131 disposed between the upper surface of the battery cell 110 and the inner surface of the case 120. In this case, it also serves to protect the battery cell 110 from external impacts or to buffer swelling of the battery cell 110.

In addition, when a plurality of battery cells 110 are provided, the inner pad 130 may be disposed between the battery cells 110 adjacent to each other. That is, the inner pad 130 includes a center pad 133 disposed between the battery cells 110 adjacent to each other, and in this case, it also serves to block heat transfer between the battery cells 110 adjacent to each other.

As set forth above, the battery module of the present disclosure has an advantage of preventing propagation of ignition of battery cells.

In another aspect, the battery module of the present disclosure has an advantage of inducing flames externally or extinguishing fires when the battery cell is ignited.

In another aspect, when the battery module of the present disclosure is mounted in an electric vehicle, there is an advantage in that a problem that an occupant of the electric vehicle is affected by the flames when the battery cell is ignited can be minimized.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

While example embodiments have been shown and described above, it will be apparent to those skilled in the art that modifications and variations could be made without departing from the scope of the present inventive concept as defined by the appended claims.

What is claimed is:

1. A battery module, comprising:

a body frame unit comprising an exterior case of the battery module; and a plurality of battery sub-packing units each battery sub-packing unit including pouch battery cells and a battery cell enclosing case in which the pouch battery cells are accommodated, wherein the body frame unit comprising the exterior case surrounds the plurality of battery sub-packing units, wherein the battery cell enclosing case inside the body frame unit includes a sub vent hole for discharging flame and gas from an interior of the battery cell enclosing case, and a sub guide pipe in fluid communication with the interior of the battery cell enclosing case via the sub vent hole and extending out of the battery cell enclosing case, wherein the body frame unit comprises an end frame covering front and rear wall portions of the plurality of battery sub-packing units, wherein the end frame includes a vent hole for discharging the flame and gas from the body frame unit to an exterior of the battery module, a guide pipe disposed at the vent hole, communicating with the vent hole, and extending to the sub guide pipe so as to be connected to the sub guide pipe, and an open/close portion disposed at the vent hole, and configured to open and close the vent hole according to pressure of gas discharged from an inside of the battery sub-packing units, wherein each battery sub-packing unit directly discharges the flame or the gas to the exterior of the battery module through an interconnected structure of a) the sub-vent hole discharging the flame or the gas from the interior of the battery cell enclosing case accommodating the pouch battery cells, b) the sub guide pipe extending out of the battery cell enclosing case accommodating the pouch battery cells and sealed from an exterior space outside the battery cell enclosing case, c) the guide pipe connected to the sub guide pipe and extending to the vent hole, d) the vent hole on the end frame of the body frame unit and e) the open/close portion disposed at the vent hole, thereby providing for discharge of the flame or the gas individually from each battery sub-packing unit to the exterior of the battery module so as to prevent flame or gas from propagating between different ones of the battery sub-packing units, and wherein the sub guide pipe and the guide pipe are connected to extend in a first direction toward the vent hole, the first direction being a longitudinal direction of the pouch battery cells, such that gas generated in the battery sub-packing unit is guided in the longitudinal direction, turned downward in a second direction, and discharged in a third direction parallel to the first direction to the exterior of the battery module.

2. The battery module of claim 1, wherein the battery cell enclosing case comprises an end panel disposed at front and rear portions of the pouch battery cells including an electrode tab of the pouch battery cells, fastened such that the electrode tab extends externally, and having the sub vent hole formed in a lower end portion of the end panel; and a surrounding cover configured to surround at least a portion of an outer surface of the pouch battery cells, along an edge of the end panel, the end panel being coupled to both end portions of the surrounding cover.

3. The battery module of claim 2, wherein the sub guide pipe in fluid communication with the interior of the battery cell enclosing case is connected to the guide pipe which extends to the vent hole in the body frame unit and which extends to a metal foam block at the vent hole.

4. The battery module of claim 2, wherein the surrounding cover is made of the same metal material as the body frame unit.

5. The battery module of claim 4, wherein the surrounding cover comprises aluminum or metal having a melting point of at least 1000° C. or higher.

6. The battery module of claim 2, wherein the surrounding cover comprises:

a receiving can in which the end panel is respectively coupled to both end portions, and provided in a form surrounding a lower surface portion and a side surface portion of the pouch battery cells facing outwardly; and an upper panel coupled to an upper end of the receiving can, and configured to surround an upper surface of the pouch battery cells.

7. The battery module of claim 6, wherein the receiving can comprises a protrusion in an upper end thereof, wherein the upper panel comprises a groove for accommodating the protrusion.

8. The battery module of claim 1, wherein the plurality of battery sub-packing units comprise an inner pad disposed inside the battery cell enclosing case, in contact with at least a portion of the pouch battery cells accommodated in the battery cell enclosing case, and configured to extinguish fires inside the battery cell enclosing case by generating at least one of carbon dioxide and nitrogen during oxidation.

9. The battery module of claim 8, wherein the inner pad includes a melamine material.

10. The battery module of claim 1, wherein the vent hole is open in front and rear directions of the battery sub-packing units, or is open downwardly.

11. The battery module of claim 1, wherein the end frame comprises a metal foam block inserted in the vent hole and including a material melted by a flame generated inside the battery sub-packing units.

12. The battery module of claim 1, wherein the open/close portion comprises:

a sealing plate disposed at the vent hole;

an open/close rod including a protruding tab at one end of the open/close rod, wherein the sealing plate is coupled to the other end of the open/close rod; and a coil spring into which the open/close rod is inserted, one end of the coil spring being fixed to the end frame and the other end of the coil spring being fixed to the protruding tab.

13. The battery module of claim 1, wherein the open/close portion comprises:

a sealing plate disposed at the vent hole; and a plate spring, one end of the plate spring being coupled to the sealing plate, and the other end of the plate spring being fixed to a fixing bolt coupled to the end frame.

14. The battery module of claim 1, wherein the body frame unit comprises:

a lower frame on which a lower wall portion of the plurality of battery sub-packing units is seated; and a side frame extending from an end portion of the lower frame, and configured to surround a side wall portion of the plurality of battery sub-packing units.

15. A battery module, comprising:

a body frame unit comprising an exterior case of the battery module; and a plurality of battery sub-packing units each battery sub-packing unit including pouch battery cells and a battery cell enclosing case in which the pouch battery cells are accommodated, wherein the body frame unit comprising the exterior case surrounds the plurality of battery sub-packing units, wherein the battery cell enclosing case inside the body frame unit includes a sub vent hole for discharging flame and gas from an interior of the battery cell enclosing case, and a sub guide pipe in fluid communication with the interior of the battery cell enclosing case via the sub vent hole and extending out of the battery cell enclosing case, wherein the body frame unit comprises an end frame covering front and rear wall portions of the plurality of battery sub-packing units, wherein the end frame includes a vent hole for discharging the flame and gas from the body frame unit to an exterior of the battery module, a guide pipe disposed at the vent hole, communicating with the vent hole, and extending to the sub guide pipe so as to be connected to the sub guide pipe, wherein, for each battery sub-packing unit, the sub vent hole, the sub guide pipe, the guide pipe, and the vent hole are connected together on a common axis and sealed from an exterior space outside the battery cell enclosing case, thereby providing for discharge of the flame or the gas individually from each battery sub-packing unit to the exterior of the battery module so as to prevent flame or gas from propagating between different ones of the battery sub-packing units, and wherein the sub guide pipe and the guide pipe are connected to extend in a first direction toward the vent hole, the first direction being a longitudinal direction of the pouch battery cells, such that gas generated in the battery sub-packing unit is guided in the longitudinal direction, turned downward in a second direction, and discharged in a third direction parallel to the first direction to the exterior of the battery module.

* * * * *